J. W. SUTTON.
COUNTERFEIT COIN DETECTOR.

No. 188,982. Patented March 27, 1877.

Witnesses:
Henry Eichling
Edward Holly

Inventor:
John W. Sutton
per James A. Whitney.
Atty.

UNITED STATES PATENT OFFICE.

JOHN W. SUTTON, OF NEW YORK, N. Y.

IMPROVEMENT IN COUNTERFEIT-COIN DETECTORS.

Specification forming part of Letters Patent No. 188,982, dated March 27, 1877; application filed February 28, 1877.

*To all whom it may concern:*

Be it known that I, JOHN W. SUTTON, of the city, county, and State of New York, have invented an Improved Counterfeit-Coin Detecter, of which the following is a specification:

The object of this invention is to provide a simple means for detecting base or clipped coin; and it comprises, first, in a counterfeit-coin detecter, a weighing-disk constructed with bearings for a knife-edge whereon the device may be fulcrumed in testing the weight of coin, and with receivers for holding the coin in proper relation with the knife-edged bearing, so that full weight will be indicated by the downward tilting of the coin, and light weight indicated by the upward tilting of the latter.

The invention also comprises, in combination with the feature just herein first specified, gage-notches or graduated receivers, serving not only to hold the coin while being weighed, but also to gage the thickness thereof, so that any variation from the true standard will be made manifest.

Figure 1:
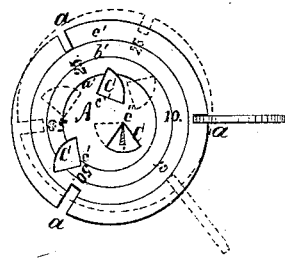
Figure 2:
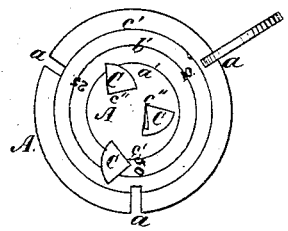
Figure 3:
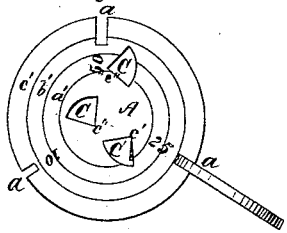
Figure 4:
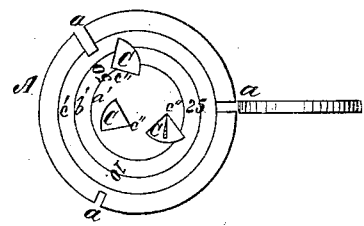
Figure 5:
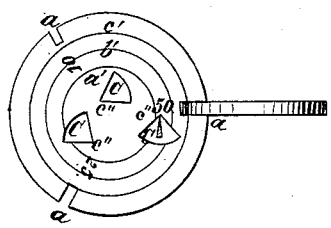
Figure 6:
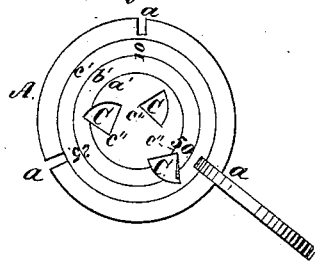

Figure 1 is a side view of a counterfeit ten-cent-coin detecter made according to my invention, showing the same as operating with a coin of true or standard weight, and Fig. 2 is a like view, showing the same as operating with a coin of light weight. Fig. 3 is a view corresponding to Fig. 1, except that the device is shown in testing a twenty-five-cent coin. Fig. 4 is a view corresponding to Fig. 3, except that the device is shown as testing the thickness of a counterfeit coin. Figs. 5 and 6 correspond to Figs. 1 and 3, except that the device is represented as testing a true fifty-cent coin.

A is a circular disk, of metal, in the circumference of which are provided a number corresponding to the collective number of denominations of coin to be tested, of slots or recesses $a$. One of these recesses, marked 10, is of a width equal to the thickness of a standard ten-cent coin, and of a depth sufficient to retain said coin when inserted edgewise therein. In like manner the receivers, marked, respectively, 25 and 50, have a width, respectively, corresponding to the thickness of a standard twenty-five-cent and fifty-cent coin, and serve, in like manner, to retain the coins in place when inserted therein edgewise.

It will be seen from this that if a counterfeit or sweated coin is attempted to be inserted into one or the other of these receivers, a too great thickness of such coin will prevent its entering the receiver, while a too great thinness will be perceptible by the lack of tightness of the coin in such receiver.

On one side or flat surface of the disk A may be provided the circular lines $a'$ $b'$ $c'$, $a'$ having a diameter equal to that of a standard ten-cent coin; $b'$, equal to that of a standard twenty-five-cent coin, and $c'$ equal to that of a standard fifty-cent coin. By placing one or the other of such coins within its appropriate circular mark on the disk A, any variation from the true diameter of the standard coin is at once made manifest, and the sweated or bogus character of the coin made evident.

Adjacent to each of the receivers $a$ is an angular opening, $c$, the angular corners $c''$ of which is capable of receiving a knife-edge. Each of the openings $c$ is arranged in such relation with its adjacent receiver $a$, that when the knife-edge is inserted, as just described, the weight of a suitable coin inserted in said adjacent receiver will cause the weight of the coin to more than balance the weight of the disk, the knife-edge serving as a fulcrum; whereas, should the coin be too light, as is common with bogus or sweated coin, the weight of the disk will counterbalance that of such coin and move the same in an upward direction, thereby making manifest the light and counterfeit or sophisticated character of such coin.

For example—when a ten-cent coin is inserted in the receiver $a$, marked 10, the disk being balanced on a knife-edge inserted in the adjacent angular opening $c$, as shown in Fig. 1, the weight of the coin will turn the parts into the position indicated in dotted outlines in said Fig. 1; whereas, should the coin be light or bogus, it will be moved in the opposite direction, and its bad character thus made manifest. So, also, in case a twenty-five-cent coin is inserted in the receiver $a$, marked 25, the disk supported on a knife-edge, in the same manner as explained, the true or standard coin will turn downward, as indicated in Fig. 3, and the similar result happens when a fifty-cent coin is inserted into the receiver $a$, marked 50, as represented in Figs. 5 and 6.

It is, of course, to be understood, that by making the receivers $a$ of suitable gage, the circular lines $a'$ $b'$ $c'$ of suitable diameter, and the angular openings $c$ in proper relation with the receivers $a$, the invention can be adapted to the testing of coins for any country, standard, or value.

It is, of course, to be understood, that the knife-edge may be most conveniently furnished by the blade of a pen-knife, or other suitable device, it being only required that a sufficient support or fulcrum should be provided, on which the disk may turn, as hereinbefore explained. It is, moreover, to be observed, that the invention, as herein set forth, constitutes a pocket implement which may be carried in the pocket with the same ease and convenience as the coins which it is designed to weigh, thereby enabling the same to be used under all circumstances and exigencies with ease, convenience, and dispatch.

What I claim as my invention is—

1. The coin-detecter constructed with the receivers $a$ and the angular openings $c$, arranged in relation thereto, substantially as and for the purpose herein set forth.

2. The receivers $a$, having a gaged or graduated width coincident with the thickness of the coin to be tested, and provided in relation with the angular opening $c$, substantially as and for the purpose herein set forth.

JOHN W. SUTTON.

Witnesses:
EDWARD HOLLY,
H. WELLS, Jr.